United States Patent [19]
Andreev et al.

[11] 4,250,929
[45] Feb. 17, 1981

[54] PNEUMATICALLY OPERATED SWITCH

[76] Inventors: Evgeny I. Andreev, ulitsa K. Marxa, 10, kv. 98; Mikhail A. Bykov, ulitsa 50 let VLKSM, 10-a, kv. 31; Anatoly K. Zolotarev, ulitsa Isaeva, 2, korpus 2, kv. 116, all of Kaliningrad, Moskovskoi oblasti; Dmitry S. Sazhin, ulitsa Mosfilmovskaya, 11, korpus 1, kv. 77, Moscow, all of U.S.S.R.

[21] Appl. No.: 86,774

[22] Filed: Oct. 22, 1979

[51] Int. Cl.³ .............................................. F16K 31/12
[52] U.S. Cl. ................. 137/607; 137/552.5; 137/863; 137/869
[58] Field of Search ............... 137/552.5, 595, 606, 137/607, 863, 869; 235/201 ME

[56] References Cited
U.S. PATENT DOCUMENTS

| | | |
|---|---|---|
| 2,751,933 | 6/1956 | Urteaga ................... 137/595 X |
| 3,156,157 | 11/1964 | Smith ....................... 137/863 X |
| 3,702,909 | 11/1972 | Kraakman ................ 137/863 X |
| 3,708,047 | 1/1973 | Kuhnle .................. 137/552.5 X |
| 3,809,120 | 5/1974 | Schweppe ............. 137/552.5 X |

Primary Examiner—Robert G. Nilson
Attorney, Agent, or Firm—Steinberg & Raskin

[57] ABSTRACT

A pneumatically operated switch comprises elastic-wall chambers arranged in the form of an array, and distortion-imposing means for the elastic walls of said chambers, which are positioned in the array lines of a first direction, communicating with a drive means. The inlet ports of the chambers are coupled with data sources and their outlet ports constituting ducts, positioned in the array lines of a second direction, are coupled with inlet ports of additional elastic-wall chambers communicating with an independent drive means through their own distortion-imposing means. The outlet ports of the additional chambers are coupled via an outlet duct with an external apparatus.

19 Claims, 10 Drawing Figures

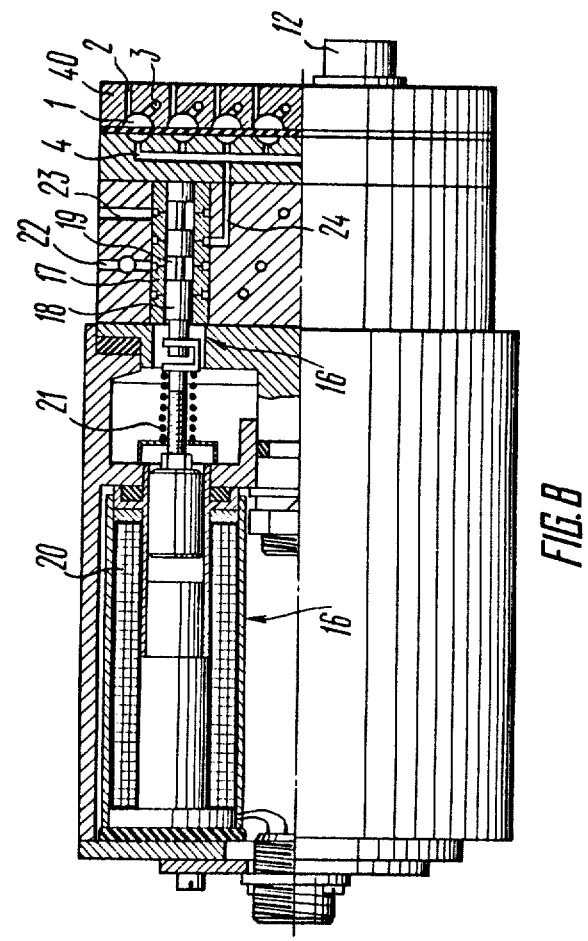

PNEUMATICALLY OPERATED SWITCH

FIELD OF THE INVENTION

The invention relates to data-measuring systems, and more particularly to pneumatically operated switches intended for switching the signals available from gaseous- or liquid-medium data sources.

The apparatus of invention is suitable for use in test check measurements, for example, in measuring the pressure at a number of test points of the object, as a distributor or selector of pneumatic signals in automatic control systems, for control, regulation and checking the parameters of production processes, and for analysing the gas contents by means of gas analyzers in chemical industry.

DESCRIPTION OF THE PRIOR ART

Known in the art are penumatically operated switches (cf. the USSR Inventor's Certificate No. 158,709, Int.Cl. G01l 19/00, 1963; the USSR Inventor's Certificate No. 594,422, Int.Cl. G01l 19/00, 1976; U.S. Pat. No. 3,246,667, Int.Cl. 137-62511, 1976) comprising an immovable disc (stator) with inlet ports coupled with data sources, a rotatable disc (rotor) with an outlet duct, a position pickup for the rotor, and a cyclically operated drive means.

The known pneumatically operated switches offer a limited range of the pressures being switched, said limitation being related to lower pressures. This is due to the fact that there is a movable packing which is also responsible for poor reliability and short service life of the switches.

In the known switches, the data sources are switches according to a given sequence and cannot be therefore joined together so as to provide for optimum and flexible systems. In addition, the known switches have large dimensions, low operational speed and sophisticated design features.

There is a pneumatically operated switch (cf. the USSR Inventor's Certificate No. 505,917, Int.Cl. G01l 19/00, 1974; GDR Patent No. 89,991, Int.Cl. G01l 19/00, 1970) comprising an immovable hollow cylinder with inlet ports coupled with data sources, a piston having an outlet duct and performing a rotational or progressive movement, a position pickup for the piston, and a cyclically operated drive means.

The described switch is disadvantageous in that a poor hermetic condition is provided by a movable packing between the cylinder and piston. Other disadvantages are concerned with sequential switching of the data sources, large dimensions, and sophisticated design features.

Known in the art is a pneumatically operated switch (cf. the USSR Inventor's Certificate No. 194,376, Int.Cl. G01l 19/02, 1966) comprising an immovable disc (housing) with inlet ports coupled with data sources and also coupled with an outlet duct via normally closed valves. The valves are usually group-arranged valves with a drive means having a position pickup.

The described switch are disadvantageous in that they feature large dimensions, low operational speed, complex design, and sequential manner of switching data sources.

There is a prototype of the proposed invention which is a pneumatically operated switch (the USSR Inventor's Certificate No. 575,520, Int.Cl. G01l 19/00, 1976) comprising chambers with elastic walls having inlet ports, coupled with data sources, and also having outlet ports, coupled with an external apparatus via an outlet duct; and distortion-imposing means for the elastic walls of the chambers, coupled with a drive means having a position pickup.

This switch commutates pneumatic signals in a sequential manner only and cannot therefore provide for optimum and flexible systems. It operational speed is low since it has a long ring-shaped outlet duct whose full volume is held in permanent communication with an external apparatus. The switch uses distortion-imposing means implemented as plunger. Its dimensions are large since the chambers are arranged in a single row, one after another and its design is sophisticated since it uses a position pickup.

The invention therefore seeks to attain a pneumatically operated switch in which the chambers are positioned and interconnected in a novel manner, with the result that data sources are switches on a random basis, the operational speed is increased considerably, the dimensions are decreased and the design features of the switch are simplified.

SUMMARY OF THE INVENTION

An object of the invention is to provide a pneumatically operated switch capable of switching data sources on a random operated switch capable of switching data sources on a random basis so that optimum and flexible systems can be constructed on the basis of such switches.

Another object of the invention is to provide a pneumatically operated switch with higher operational speed.

Yet another object of the invention is to provide a pneumatically operated switch having smaller overall dimensions.

Still another object of the invention is to provide a pneumatically operated switch featuring improved design features.

There is provided a pneumatically operated switch comprising elastic-wall chambers having inlet ports communicating with data sources, and having outlet ports communicating with an external apparatus via an outlet duct, distortion-imposing means for the elastic walls of the chambers, and a drive means, the chambers being arranged, according to the invention, in the form of an array, the distortion-imposing means of the elastic walls of the chambers incorporated in the array lines of a first direction being adapted to constitute one group and communicate with the drive means, the outlet ports of the chambers being coupled with ducts, positioned in the array lines of a second direction, and also with inlet ports of additional elastic-wall chambers each unique for each array line belonging to the second direction, said additional chambers being coupled with an independent drive means via their own distortion-imposing means for their elastic walls and being provided with outlet ports which are coupled with the external apparatus with the outlet duct.

Preferably, the array lines of the first direction should be the array columns and the array lines of the second direction are the array rows.

Advantageously, the array lines of the first direction should be the array rows and the array lines of the second direction should be the array columns.

Preferably, the chambers and the additional chambers should be implemented in the form of single-diaphragm air-jet relays, the distortion-imposing means should be implemented in the form of ducts having respective ones of their ends coupled with the relays, the other ends of the distortion-imposing means constituting one group being coupled with the independent drive means, the drive means and the independent drive means being implemented as a single pressure source employing a gaseous or a liquid medium and having its outlet coupled with the relays belonging to the array lines of the first direction via a first distributing means, and with the relays belonging to the array lines of the second direction via a second distributing means.

Advantageously, any of the distributing means should be implemented in the form of distribution units.

Preferably, any of the distribution units should comprise a slide-type electromagnetically controlled distributing element.

Advantageously, the distribution units should have their inlets joined together and coupled with the outlet of the pressure sources and their outlets coupled with respective array lines.

Preferably, the slide-type distributing elements should be connected in series with one another and implemented each as an element having inlets equal in number to $2^N$ and having outlets equal in number to $2^{N-1}$, where N is the serial number of the given element, any of the elements, except the last one, having its inlets coupled with the outlets of the following one of the elements, the outlet of a first one of the elements being coupled with a discharge duct, and the outlets of the last one of the elements being coupled with control inlets of the relays and, via air-jet resistors, with the pressure source.

Advantageously, the drive means and the independent drive means are implemented in the form of two pressure sources employing, respectively, lower and higher pressures, said pressure sources being coupled with a distributing means that comprises single-diaphragm air-jet relays equal in number to the array lines, said relays being coupled with respective distortion-imposing means, and also comprises delay lines coupled with respective relays, and air-jet resistors, the distortion-imposing means of respective array lines being coupled, via the relays, with the lower pressure source, via the first resistors, with the atmosphere, and, via the second resistors, with the outlets of the delay lines which connect the higher pressure source, a control inlet of the air-jet relay of the first distortion-imposing means being coupled with the higher pressure source, and a control inlet of each of the following relays being coupled with the outlet of the preceding delay line and with the delay line of that relay.

Preferably, the delay line of the distributing means should comprise a serial arrangement of an air-jet resistor, an air-jet capacitor and a single-diaphragm air-jet relay with the loaded diaphragm, the relay having its control inlet coupled with the lower pressure source, the capacitor being coupled, via a second single-diaphragm air-jet relay with the loaded diaphragm, with the atmosphere, the second relay belonging to the first delay line having its control inlet coupled with the higher pressure source, and the second relays belonging to the following delay lines being coupled with control inlets of respective relays of the distributing means.

Advantageously, the array should ne divided into n sections each of which having an outlet duct coupled with an inlet port of an auxiliary elastic-wall chamber, which is unique for the given outlet duct and is coupled, via a distortion-imposing means for the elastic walls of the auxiliary chamber, with an additional drive means, the outlet ports of the auxiliary chambers being coupled with the outlet duct of the main chambers, the distortion-imposing means belonging to respective array lines of the first direction, incorporated in each array section, being joined together and coupled with the drive means, and the distortion-imposing means of the additional chambers belonging to respective array lines of the second direction, incorporated in each array section, being joined together and coupled with the independent drive means.

Preferably, the array sections are positioned in a single plane.

Advantageously, the array sections are spaced by a distance k from one another, said distance being measured in a direction perpendicular to the plane accommodating the array sections.

The switch of the invention make it possible to construct optimum flexible and more cheaper data/measuring systems, and also offers higher operational speed and smaller dimensions.

DESCRIPTION OF THE DRAWINGS

The invention will now be described in more detail, by way of example, with reference to the accompanying drawings, in which:

FIG. 8 is a longitudinal section of a pneumatically operated switch, according to the invention;

DETAILED DESCRIPTION OF THE INVENTION

Figure 1:
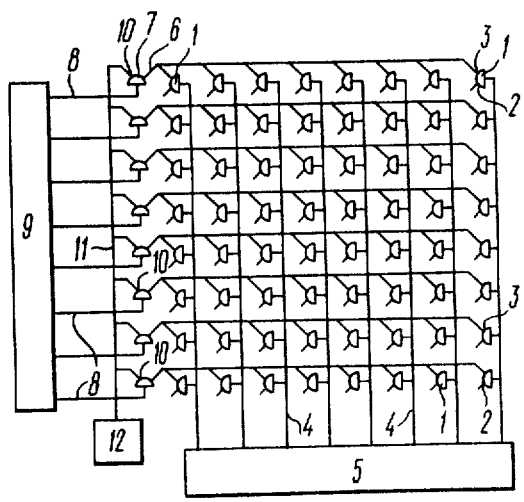
FIG. 1 is a block diagram of a pneumatically operated switch, according to the invention.

The pneumatically operated switch of the invention comprises chambers 1 (FIG. 1) arranged in the form of an array and having elastic walls, inlet ports 2 coupled with data sources (not shown) and other ports 3. There is a group of distortion-imposing means 4 for the elastic walls of the chambers 1, incorporated in the array lines of a first direction and communicating with a drive means 5. The outlet ports 3 of the chambers 1 are coupled with ducts, positioned in the array lines of a second direction, and also with inlet ports 6 of additional elastic-wall chambers 7 each unique for each array line belonging to the second direction. The additional chambers 7 are coupled with an independent drive means 9 via their distortion-imposing means 8 for their elastic walls and are provided with outlet ports 10 which are coupled with an external apparatus 12 via an outlet duct 11.

The array lines of the first direction are the array columns and the array lines of the second direction are the array rows.

According to another embodiment of the invention, the array lines of the first direction are the array rows and the array lines of the second direction are the array columns.

Figure 2:
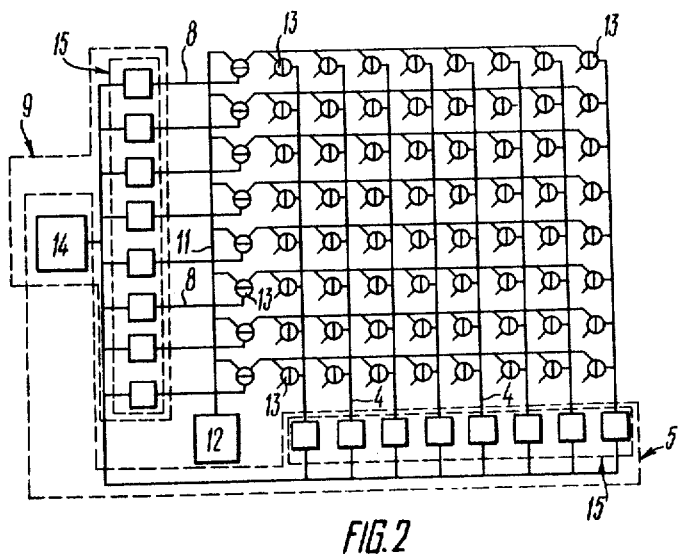
FIG. 2 is another block diagram of a pneumatically operated switch, according to the invention.

The chambers 1 and the additional chambers 7 are implemented as single-diaphragm air-jet relays 13 (FIG. 2). The distortion-imposing means 4,8 are implemented as ducts having respective ones of their ends coupled with the single-diaphragm air-jet relays 13 positioned in respective lines of the array. The other ends of the distortion-imposing means 4 are coupled with the drive means 5, whereas the other ends of the distortion-imposing means 8 are coupled with the independent drive means 9.

The drive means 5 and the independent drive means 9 are implemented as a single pressure source 14 employing gaseous or liquid medium and having its outlet coupled with the relay 13 belonging to the array lines of the first direction via a first distributing means 15, and with the relays 13 belonging to the array lines of the second direction via a second distributing means 15.

Any of the distributing means 15 is implemented in the form of distribution units.

According to an embodiment of the invention, the inlets of the distribution units are joined together and coupled with the outlet of the pressure source 14 while the outlets of the distribution units are coupled with respective array lines.

Figure 3:
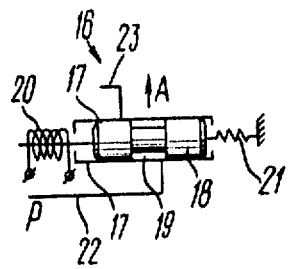
FIG. 3 is a schematic showing a slide-type distributing element, according to the invention.

Each distribution unit can be implemented as a slide-type electromagnetically controlled distributing element 16 (FIG. 3).

The slide-type distributing element 16 comprises a housing 17 accommodating a plunger 18 with a recessed portion 19. One side of the plunger 18 mounts electromagnet winding 20 and the other side carries a reset spring 21. The element 16 has a pressure duct 22 and a discharge duct 23. The arrow A represents a communication between the element 16 and the relay 13.

Figure 4:
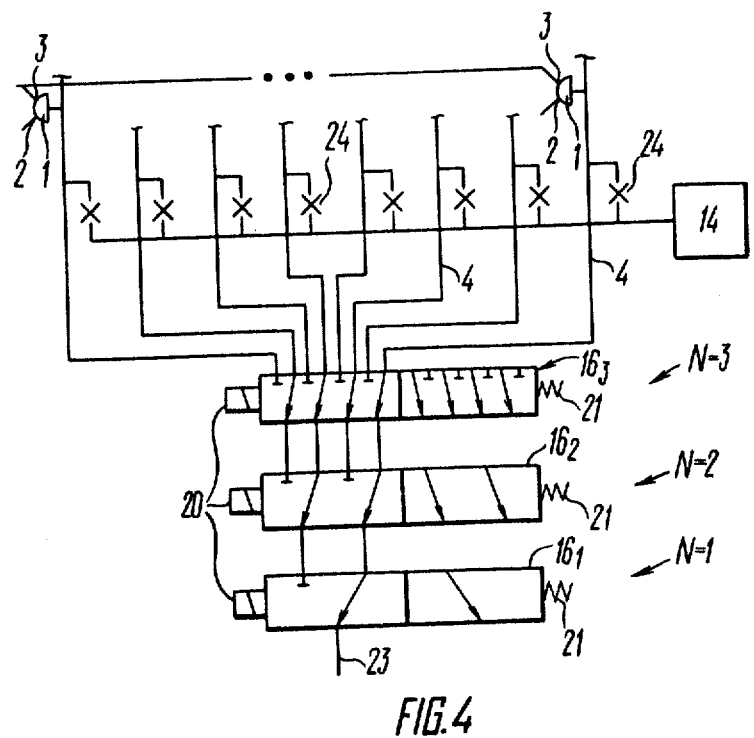
FIG. 4 is a circuit diagram of a drive means, according to the invention.

The elements 16 (FIG. 4) connect one another in series and are provided each with inlets equal in number to $2^N$ and with outlets equal in number to $2^{N-1}$, where N is the serial number of the element. Any of the elements 16, except the last one, has its inlets coupled with the outlets of the following element, and has its outlets coupled with the inlets of the preceding element. The outlet of the first distributing element 16 communicates with the discharge duct 23, while the inlets of the last element 16 are coupled with control inlets of respective relays 13 and, via air-jet resistors 24, to the pressure source 14.

According to the given embodiment of the invention, the distributing element $16_3$ is a 12-way, two-position structure with eight inlets and four outlets. The outlets of that element are coupled to the inlets of the element $16_2$ which is a 6-way two-position structure with four inlets and two outlets. The outlets of the element $16_2$ are coupled with the inlets of the element $16_1$ which is a two-way three-position structure with two-inlets and one outlet which is coupled with the discharge duct 23. The elements $16_1, 16_2, 16_3$ have electromagnet drives and their reset springs 21 (FIG. 3) operate to reset the plungers 18 with the windings 20 de-energized.

A lesser number of the slide-type distributing elements 16 provides for smaller dimensions of the switch of the invention since the drive means 5,9 (FIG. 1) are given smaller dimensions. As a result, the switch can be installed in small-size objects under investigation. Such a switch has a smaller inertia property, with the result that the time during which the model is tested in the wind tunnel is reduced and small absolute pressures are measured with higher accuracy.

The drive means 5 and the independent drive means 9 can be implemented in the form of a lower pressure source 25 (FIG. 5), a higher pressure source 26, and a distributing means 27, for each direction of array lines, which comprises single-diaphragm air-jet relays 28 equal in number to the array lines, the relays 28 being coupled with respective distortion-imposing means 4,8.

The distributing means 27 also comprises delay lines 29 coupled with respective relays 28, and air-jet resistors 30,31.

The relays 28, delay lines 29 and resistors 30,31 constitute the ducts of the distributing means 27.

The distortion-imposing means 4,8 communicate, via respective relay 28, with the lower pressure source 25, and, via the resistor 31, with the outlets of the delay lines 29 which are coupled with the higher pressure source 26.

The control inlet of the relay 28 of a first distortion-imposing means 4,8 is coupled with the higher pressure source 26, whereas the control inlets of the relays 28 of the following distortion-imposing means 4,8 are coupled with the outlets of the preceding delay lines 29.

The delay line 29 comprises a serial arrangement of an air-jet resistor 32, an air-jet capacitor 33 and a single-diaphragm air-jet relay 34 with the loaded diaphragm, which relay 34 having its control inlet coupled with the lower pressure source 25. The air-jet capacitor 33 is coupled, via a single-diaphragm air-jet relay 35 with the loaded diaphragm, with the atmosphere. The control inlet of the relay 35 of the first delay line 29 is coupled with the higher pressure source 26 while the control inlet of the relays 35 of the following delay lines 29 are coupled with the control inlets of respective relays 28.

The array can be divided into n sections (with n=4) each of which has an outlet duct 36 (FIG. 6) coupled with an inlet port of an auxiliary elastic-wall chamber (37), which is unique for the given outlet duct 36 and is coupled, via a distortion-imposing means 38 for the elastic walls of the chamber 37, with an additional drive means 39. The outlet ports of the chambers 37 are coupled with the outlet duct 11, the distortion-imposing means of respective array lines of the first direction, incorporated in each array section, are joined together and coupled with the drive means 5, while the distortion-imposing means 8 of the chambers 7 of respective array lines of the second direction, incorporated in each array section, are joined together and coupled with the independent drive means 9.

The array sections can be positioned in a single plane.

Figure 7:
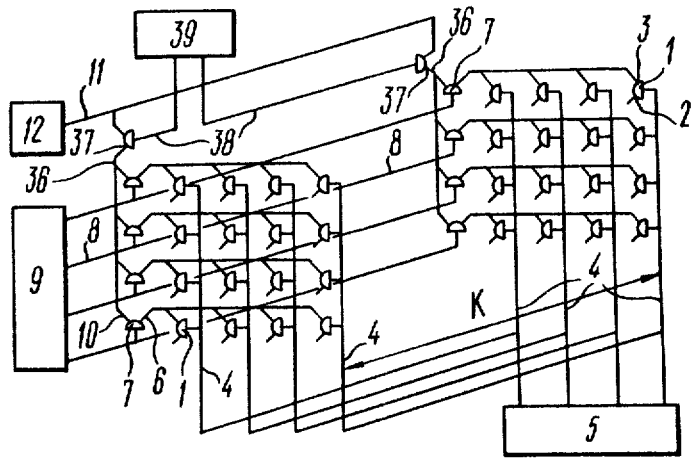
FIG. 7 is a block diagram of still another embodiment of a pneumatically operated switch, according to the invention.

The array sections (FIG. 7) can be spaced by a distance K one from another, said distance being measured in a direction perpendicular to the plane accommodating the array sections.

FIG. 8 shows a variant of the construction of the penumatically operated switch of the invention. It includes chambers 1 incorporated in a housing 40 which mounts an external apparatus 12. The housing 40 also accommodates the slide-type distributing elements 16 (FIG. 3).

Figure 5:
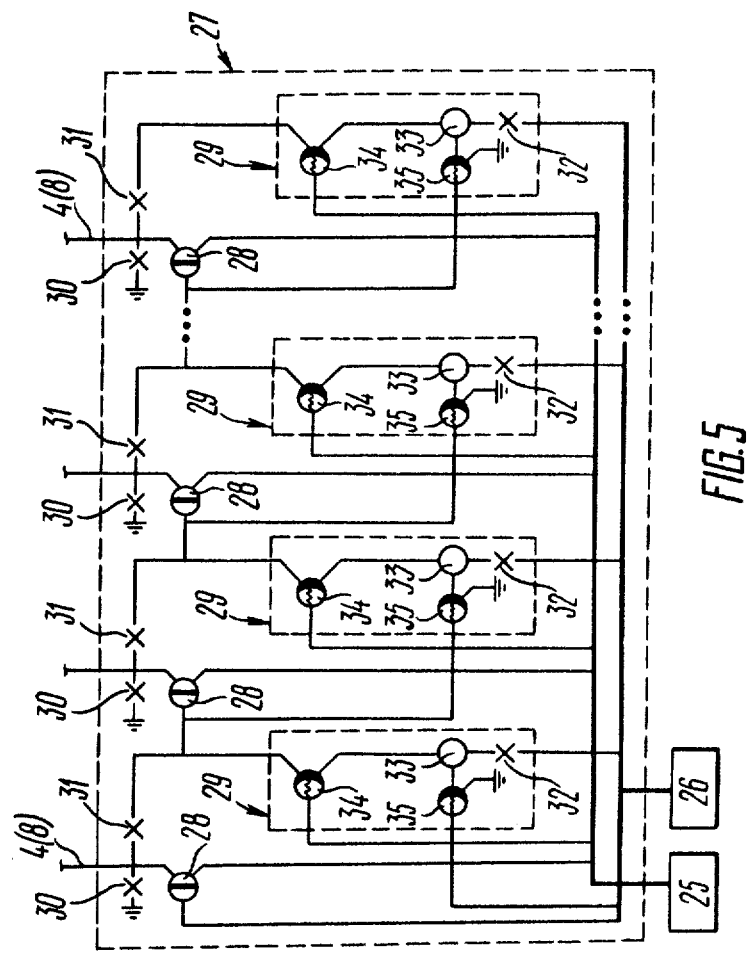
FIG. 5 is another circuit diagram of a drive means, according to the invention.
Figure 9:
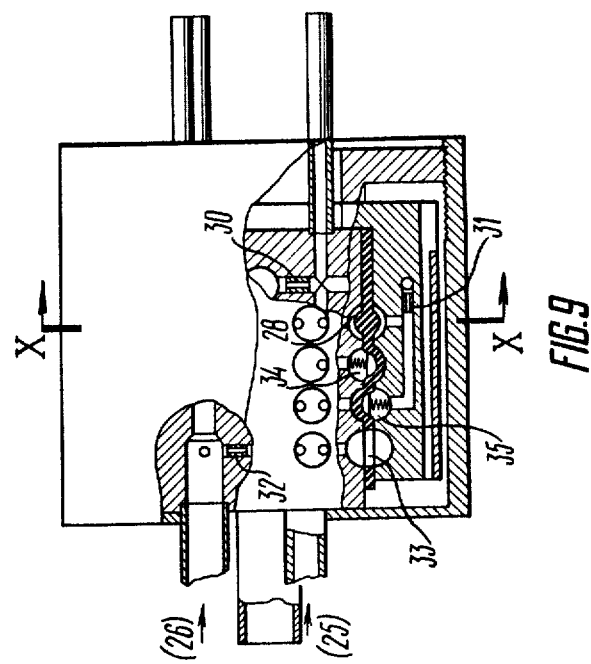
FIG. 9 is a longitudinal section of a drive means, according to the invention.

FIG. 9 illustrates another variant of the construction of the drive means of FIG. 5, implemented by the printed-circuit method.

Figure 10:
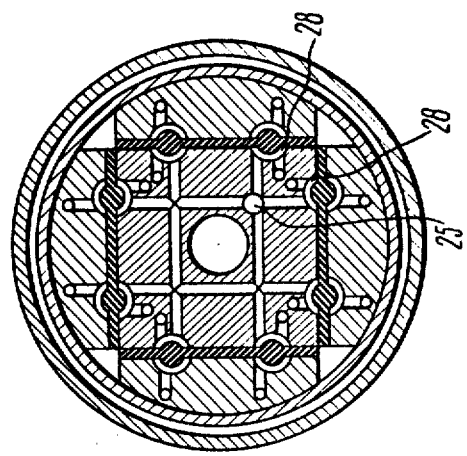
FIG. 10 is the section X—X of FIG. 8, according to the invention.

FIG. 10 shows the section X—X of FIG. 9.

The pneumatically operated switch of the invention works in the following manner. The drive means 5 generates, with the help of the distortion-imposing means 4, a force applied to the elastic walls of the chambers 1 which are available to all the array columns except a single one, for example, the rightmost column in which the inlet port 2 selected for communication purposes is positioned.

The independent drive means 9 generates, with the help of the distortion-imposing means 8, a force applied to the elastic walls of the chambers 1 which are available to all the array rows except a single one, for example, the lower row in which the inlet port 2 selected for communication purposes is located.

The force generated by the drive means 5 tends to deflect the elastic walls of the chambers 1 associated, with the result that the inlet ports 2 are isolated from the outlet ports 3 of these chambers.

On the other hand, the force generated by the drive means 9 tends to deflect the elastic walls of the chambers 7 associated, with the result that the inlet ports 6 are isolated from the outlet ports 10 of these chambers.

Under these conditions, only those chambers 1 which are located, for example, in the rightmost array column and whose elastic walls are not subject to the force generated have their inlet ports 2 coupled with the inlet ports 6 of the chambers 7, whereas the external apparatus 12 communicates with the inlet port 6 of a single chamber 7 which is located, for example, in the lower array row and whose elastic walls are not subject to the force generated.

As a result, only one inlet port 2 communicates with the external apparatus, which is the inlet port 2 selected for communication purposes and positioned at the intersection of the array column, whose chambers 1 are not affected by the force, and the array row, whose chamber 7 is not affected by the force too, which inlet port 2 may be positioned, for example, at the intersection of the rightmost array column and the lower array row.

Note that any other inlet port 2 can be connected with the external apparatus 12 in analogous manner.

Therefore, the switch of the invention makes it possible to connect data sources to an external apparatus in a random fashion.

The switch of FIG. 2 operates in a manner analogous to that employed for the switch of FIG. 1.

The force applied to the diaphragms of the relays 13 of the switch of the invention is generated when the gas or liquid under pressure passes from the pressure source 14 through the duct 22 (FIG. 3) and is then led in the direction of the arrow A to the slide-type distributing elements 16 via the distortion-imposing means 4,8 (FIG. 2) with the windings 20 (FIG. 4) de-energized.

The force applied to the diaphragms of the relays 13 (FIG. 2) is removed by moving the plunger 18 (FIG. 3) to its leftmost position when the current runs through the winding 20. Under these conditions, the duct 22 is closed by the plunger 18 and the relay 13 (FIG. 2) is brought into communication with the discharge duct 23 (FIG. 3).

The force is applied to the inlets of the distributing element $16_3$ (FIG. 4) by delivering gas or liquid from the pressure source 14 through the air-jet relay 24.

In this case, the elastic walls of the chambers 1,7 (FIG. 1), except the chambers 1 of the rightmost array column and the chamber 7 in the lower array row, tend to deflect in a manner that the ports 2,3 are isolated from the ports 6,10. The ports 2,3 of the chambers 1 of the rightmost array column are held communicated (with their elastic walls not deflected) since the rightmost distortionimposing means 4 is coupled, via the slide-type distributing elements $16_3$ (FIG. 4), $16_2, 16_1$, with the discharge duct 23 which communicates with the atmosphere and since the working cross-sections of the elements $16_3, 16_2, 16_1$ are greater than the working cross-section of the air-jet resistor 24. The difference between the above cross-sections is selected to be equal to a value at which the pressure within the cavities before the elastic walls of the chambers 1,7 (FIG. 1) drops down to a value less than the force the elastic walls of the chambers 1,7 require to deflect so as to isolate the ports 2,3 and 6,10.

Similarly, no deflection of the elastic wall of the chamber 7 of the lower array row occurs. As a result, only one inlet port 2, found at the intersection of the rightmost array column and the lower array row, communicates with the outlet duct 11. To connect the latter with any other inlet port 2, the distributing elements $16_3$ (FIG. 4), $16_2, 16_1$ must be switched over correspondingly, with the result that the discharge duct 23 is brought into communication with that distortion-imposing means 4 which connects the chamber 1 having the required inlet port 2, and also into communication with that distortion-imposing means 8 (FIG. 1) which is positioned in the same array line as that inlet port 2.

Switching the three distributing elements 16 (FIG. 4) provides for eight combinations of connecting the discharge duct 23 with the inlet of the distributing element $16_3$.

The distributing means 27 for the array lines of the first direction operates in the following manner. In the initial state, the air from the lower pressure source 25 (FIG. 5) passes through the relays 28 to the distortion-imposing means 4,8 (FIG. 2) which are subject to the pressure and isolate the inlets of respective relays 3 from their outlets. During the operation, the air is delivered to the distributing means 27 from the higher pressure source 26. That air is led to the air-jet relays 28,35 of the first duct of the distributing means 27 and to the inlets of the delay lines 29. The relay 28 is thus closed and the delivery of the air from the lower pressure source 25 to the first distortion-imposing means 4(8) is stopped. Since the distortion-imposing means 4(8) communicates with the atmosphere via the air-jet resistor 30, there results a pressure drop in that means. As a result, the distortion-imposing means 4(8) operates and respective inlet of the relay 13 is brought into communication with its outlet. At the same time, the air is led into the capacitors 33 of the delay lines 29, via the resistors 32, until a pressure is produced which is determined by the pressure across the control inlet of the relays 35 and by the pressure drop at which these relays are made open. When the pressure within the capacitor 33 of the first delay line 29 reaches a value exceeding the sum of the lower pressure acting of the control inlet of the relay 34 and the opening pressure drop for that relay, the latter is made open. The air under pressure is led to the first distortion-imposing means 4(8) from the outlet of the first delay line 29 via a divider employing the resistors 31,30. As a result, the distortion-imposing means 4(8) is reset and the inlet of the respective relay 13 is isolated from its outlet. The air under pressure from the outlet of the delay line 29 is also led to the relays 28,35 of the second duct of the distributing means 27. The relay 28 is closed and the delivery of the air from the lower pressure source 25 to the second distortion-imposing means 4(8) is stopped. Since the distortion-imposing means 4(8) communicates with the atmosphere via the resistor 30 there results a pressure drop in that means. As a result, the means 4(8) operates and the inlet of the relay 13 is connected with its outlet. In addition, the air from the capacitor 33 of the third duct of the distributing means 27 is led, via the relay 35 which is made open due to a pressure drop at the outlet of the second duct, to the atmosphere and the pressure within the capacitor 33 drops down to a value at which the relay 35 is closed. After the air under pressure is applied to the control inlet of the relay 35 of the second duct, the relay 35 is made closed and the pressure within the capacitor 33 of the second duct begins to increase. At the moment when the pressure within the capacitor 33 becomes greater than the sum of the pressure acting on the control inlet of the relay 34 and the opening pressure drop for that relay, the latter is open. As a result, the distortion-imposing means, connected to the output of the next relay 34 of the distributing means 27, is reset while the next distortion-imposing means operates. This procedure continues until all the distortion-imposing means are operated and reset in a given succession. After that, the delivery of the air to the distributing means 27 from the higher pressure source 26 is stopped and the means 27 is reset.

The distributing means 27 for the array lines of the second direction operates basically in the same manner as that described above with the exception that the delay time provided by each of the delay lines 29 is equal to the sum of the delay times provided by the delay lines 29 of the distributing means 27 for the array lines of the first direction.

Figure 6:
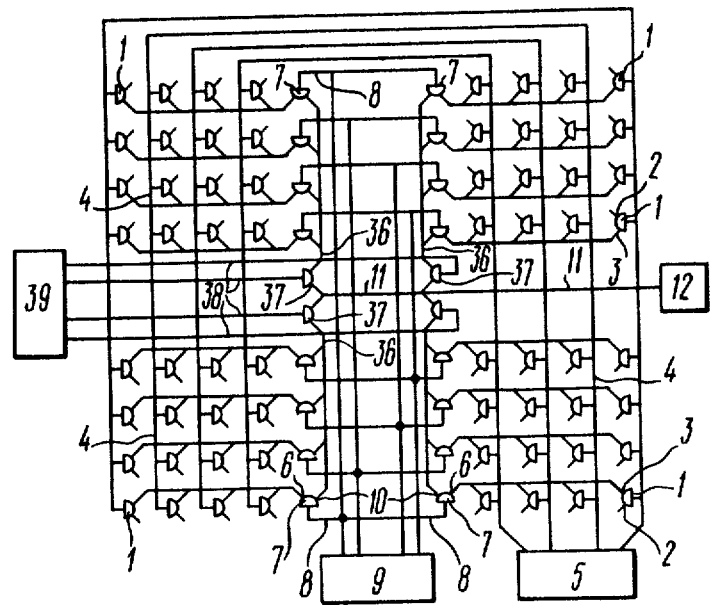
FIG. 6 is a block diagram of another embodiment of a pneumatically operated switch, according to the invention.

The external apparatus 12 is coupled with the inlet port 2 of the required chamber 1, in the switch of FIG. 6, in the following manner.

The additional drive means 39 generates, with the help of the distortion-imposing means 38, a force applied to the elastic walls of the auxiliary chambers 37, except that chamber 37 which communicates, via the outlet duct 36, with that array section which accommodates the chamber 1 having the inlet port 2 selected for communication purposes.

As a result, the outlet ducts 36 belonging to three array sections are isolated from the external apparatus 12, while that array section which includes the above-mentioned inlet port 2 is kept connected with the apparatus. Therefore, the chambers 1,7 of those array sections which are disconnected from the external apparatus 12 may assume any desirable state.

The desired inlet port 1 in that array section which communicates with the external apparatus 12 is coupled with the outlet duct 11 in a manner analogous to that employed for the switch of FIG. 1.

The proposed pneumatically operated switch has greater operational speed, small dimensions and make it possible to construct optimum, flexible and cheap data-measuring systems.

What is claimed is:

1. A pneumatically operated switch comprising: chambers; elastic walls of said chambers; inlet and outlet ports of said chambers; said inlet ports of said chambers coupled with data sources; said chambers arranged in the form of an array; said array including lines of a first and a second direction; distortion-imposing means for the elastic walls of said chambers, constituting a first group; a separate chamber unique for each of said array lines of the second direction; said separate chamber having inlet and outlet ports and elastic walls; a drive means; an independent drive means; an outlet duct; distortion-imposing means for the elastic walls of said separate chambers, constituting a second group; said distortion-imposing means for the elastic walls of the chambers in the array lines of the first direction communicating with said drive means; said outlet ports of said chambers coupled with ducts positioned in said array lines of the second direction, communicating with said inlet ports of said separate chambers which are coupled through the distortion-imposing means for their elastic walls with said independent drive means; said outlet ports of said separate chambers coupled via said outlet duct with an external apparatus.

2. A pneumatically operated switch as claimed in claim 1, comprising:
   columns and rows of said array;
   said columns of said arrays used as said array lines of the first direction;
   said rows of said array used as said array lines of the second direction.

3. A pneumatically operated switch as claimed in claim 1, comprising:
   columns and rows of said array;
   said rows of said array used as said array lines of the first direction;
   said columns of said array used as said array lines of the second direction.

4. A pneumatically operated switch as claimed in claim 1, comprising:
   a pressure source employing a gaseous or a liquid medium;
   distributing means;
   single-diaphragm air-jet relays;
   ducts;
   said chambers and said separate chambers constituting said single-diaphragm air-jet relays;
   said distortion-imposing means constituting said ducts; respective ones of the ends of said ducts coupled with said relays; the other ends of said ducts incorporated in said first group and coupled with said drive means; the other ends of the ducts of the said second group coupled with said independent drive means;
   said drive means and said independent drive means constituting said pressure source which has its outlet coupled with said relays of respective array lines via respective ones of said distributing means.

5. A pneumatically operated switch as claimed in claim 1, comprising:
   a lower pressure source;
   a higher pressure source;
   a distributing means coupled with said lower and higher pressure sources;
   said drive means and said independent drive means constituting respectively said lower and higher pressure sources and said distributing means connected with them;
   said distributing means including single-diaphragm air-jet relays equal in number to said array lines; control inlets of said relays;
   delay lines coupled with respective ones of said single-diaphragm air-jet relays and having outlets;

air-jet resistors;

said distortion-imposing means for each of said array lines, communicating, via respective single-diaphragm air-jet relay, with said lower pressure source, via a first one of said air-jet resistors, with the atmosphere, and via a second one of said air-jet resistors, with said outlet of said delay line which is coupled to said higher pressure source;

said control inlet of said single-diaphragm air-jet relay of a first one of said distortion-imposing means, communicating with said higher pressure source; said control inlet of said following one of said relays, coupled with said outlets of the preceding delay line and with the delay line of the last-mentioned relay.

6. A pneumatically operated switch as claimed in claim 1, comprising:
auxiliary chambers having elastic walls and inlet ports;
distortion-imposing means for the elastic walls of said auxiliary chambers;
said array divided into n sections; an outlet duct of each of said array sections coupled with said inlet port of said auxiliary chamber unique for each of said outlet ducts and coupled with said distortion-imposing means.

7. A pneumatically operated switch as claimed in claim 2, comprising:
a pressure source employing a gaseous or a liquid medium;
distributing means;
single-diaphragm air-jet relays;
ducts;
said chambers and said separate chambers constituting said single-diaphragm air-jet relays;
said distortion-imposing means constituting said ducts; respective ones of the ends of said ducts coupled with said relays; the other ends of said ducts incorporated in said first group and coupled with said drive means; the other ends of the ducts of said second group coupled with said independent means;
said drive means and said independent drive means constituting said pressure source which has its outlet coupled with said relays of respective array lines via respective ones of said distributing means.

8. A pneumatically operated switch as claimed in claim 2, comprising:
a lower pressure source;
a higher pressure source;
a distributing means coupled with said lower and higher pressure sources:
said drive means and said independent drive means constituting respectively said lower and higher pressure sources and said distributing means connected with them;
said distributing means including single-diaphragm air-jet relays equal in number to said array lines; control inlets of said relays;
delay lines coupled with respective ones of said single-diaphragm air-jet relays and having outlets;
air-jet resistors;
said distortion-imposing means for each of said array lines communicating, via respective single-diaphragm air-jet relay, with said lower pressure source, via a first one of said air-jet resistors, with the atmosphere, and via a second one of said air-jet resistors, with said outlet of said delay line which is coupled to said higher pressure source;

said control inlet of said single-diaphragm air-jet relay of a first one of said distortion-imposing means, communicating with said higher pressure source;

said control inlet of each following one of said relays, coupled with said outlets of the preceding delay line and with the delay line of the last-mentioned relay.

9. A pneumatically operated switch as claimed in claim 2, comprising:
auxiliary chambers having elastic walls and inlet ports;
distortion-imposing means for the elastic walls of said auxiliary chambers;
said array divided into n sections; an outlet duct of each of said array sections coupled with said inlet port of said auxiliary chamber unique for each of said outlet ducts and coupled with said distortion-imposing means.

10. A pneumatically operated switch as claimed in claim 3, comprising:
a pressure source employing a gaseous or a liquid medium;
distributing means;
single-diaphragm air-jet relays;
ducts;
said chambers and said separate chambers constituting said single-diaphragm air-jet relays;
said distortion-imposing means constituting said ducts; respective ones of the ends of said ducts coupled with said relays; the other ends of said ducts incorporated in said first group and coupled with said drive means; the other ends of the ducts of said second group coupled with said independent drive means; said drive means and said independent drive means constituting said pressure source which has its outlet coupled with said relays of respective array lines via respective ones of said distributing means.

11. A pneumatically operated switch as claimed in claim 3, comprising:
a lower pressure source;
a higher pressure source;
a distributing means coupled with said lower and higher pressure sources;
said drive means and said independent drive means constituting respectively said lower and higher pressures sources and said distributing means connected with them;
said distributing means including single-diaphragm air-jet relays equal in number to said array lines; control inlets of said relays;
delay lines coupled with respective ones of said single-diaphragm air-jet relays and having outlets;
air-jet resistors;
said distortion-imposing means for each of said array lines, communicating, via respective single-diaphragm air-jet relay, with said lower pressure source, via a first one of said air-jet resistors, with the atmosphere, and via a second one of said air-jet resistors, with said outlet of said delay line which is coupled to said higher pressure source;
said control inlet of said single-diaphragm air-jet relay of a first one of said distortion-imposing means, communicating with said higher pressure source;

said control inlet of each following one of said relays; coupled with said outlets of the preceding delay line and with the delay line of the last-mentioned relay.

12. A pneumatically operated switch as claimed in claim 3, comprising:
   auxiliary chambers having elastic walls and inlet ports;
   distortion-imposing means for the elastic walls of said auxiliary chambers;
   said array divided into n sections; an outlet duct of each of said array sections coupled with said inlet port of said auxiliary chamber unique for each of said outlet ducts and coupled with said distortion-imposing means.

13. A pneumatically operated switch as claimed in claim 4, comprising:
   distortion units;
   each of said distributing means comprising said distribution units.

14. A pneumatically operated switch as claimed in claim 11, wherein said delay line of said distributing means comprising:
   an air-jet resistor;
   an air-jet capacitor;
   first and second single-diaphragm air-jet relays with the loaded diaphragm; control inlets of said relays with the loaded diaphragm; said air-jet resistor, air-jet capacitor and first relay with the loaded diaphragm connected serially;
   said control inlet of said first relay with the loaded diaphragm, coupled with said lower pressure source;
   said air-jet capacitor communicating with the atmosphere via said second relay;
   said control inlet of said second relay of said first delay line, communicating with said higher pressure source;
   said control inlets of said relays of the following ones of said delay lines, coupled with the control inlets of the relays of said distributing means.

15. A pneumatically operated switch as claimed in claim 12, wherein said array sections are located in a single plane.

16. A pneumatically operated switch as claimed in claim 12, wherein said array sections are spaced by a distance k from one another, said distance being measured in a direction perpendicular to said plane accommodating said array sections.

17. A pneumatically operated switch as claimed in claim 13, comprising:
   a slide-type electromagnetically controlled distributing element;
   each of said distribution units constituting said slide-type distributing element.

18. A pneumatically operated switch as claimed in claim 13, comprising:
   said distribution units having inlets and outlets;
   said pressure source employing a gaseous or a liquid medium and having an outlet;
   said inlets of said distribution units joined together and coupled with said outlet of said pressure source, said outlet of each of said distribution units being coupled with its respective array line.

19. A pneumatically operated switch as claimed in claim 14, comprising:
   air-jet resistors;
   said slide-type distributing elements connected serially and having each inlets equal in number to $2^N$ and also having outlets equal in number to $2^{N-1}$, where N is the serial number of the given element;
   any of said slide-type distributing elements, except the last one, having its inlets coupled with the outlets of the following one of said elements, and having its outlets coupled with said inlets of the preceding one of said elements;
   said outlet of a first one of said distributing elements communicating with said discharge duct;
   said inlets of the last one of said distributing elements communicating with said control inlets of said single-diaphragm air-jet relays and with said pressure source via said air-jet resistors.

* * * * *